United States Patent [19]
Marchman

[11] Patent Number: 5,394,500
[45] Date of Patent: Feb. 28, 1995

[54] FIBER PROBE DEVICE HAVING MULTIPLE DIAMETERS

[75] Inventor: Herschel M. Marchman, New Providence, N.J.

[73] Assignee: AT&T Corp., Murray Hill, N.J.

[21] Appl. No.: 173,285

[22] Filed: Dec. 22, 1993

[51] Int. Cl.⁶ .............................................. G02B 6/10
[52] U.S. Cl. ................................ 385/123; 385/43; 385/142; 385/902
[58] Field of Search ............... 385/123, 125, 117, 43, 385/12, 133; 65/3.15; 250/216, 227.13, 227.11; 359/368, 385, 389; 428/392, 397, 399; 156/663, 664

[56] References Cited

U.S. PATENT DOCUMENTS

| | | | |
|---|---|---|---|
| 4,604,520 | 8/1986 | Pohl | 250/216 |
| 4,917,462 | 4/1990 | Lewis et al. | 359/368 |
| 5,018,865 | 5/1991 | Ferrell et al. | 359/368 X |
| 5,105,305 | 4/1992 | Betzig et al. | 385/12 X |
| 5,168,538 | 12/1992 | Gillespie | 385/123 |
| 5,272,330 | 12/1993 | Betzig et al. | 250/216 |
| 5,288,996 | 2/1994 | Betzig et al. | 359/368 |

OTHER PUBLICATIONS

Wickramasinghe "Scanned-Probe Microscopes" Scientific American Oct. 1989 pp. 98–105.
Binnig et al. "Atomic Force Microscope" Physical Review Letters vol. 56, #9 Mar. 1986 pp. 930–933.
Pangaribuan, T. et al., "Reproducible Fabrication Tecnhique of Nanometric Tip Diameter Fiber Probe for Photon Scanning Tunneling Microscope," Japan Journal Applied Physics, vol. 31 (1992), pp. L 1302–L 1304, Part 2, No. 9A, 1 Sep. 1992.

*Primary Examiner*—Rodney B. Bovernick
*Assistant Examiner*—Phan Thi Heartney
*Attorney, Agent, or Firm*—David I. Caplan

[57] ABSTRACT

A fiber probe device includes a fiber segment that has at least three sections. An uppermost section has the largest diameter; an intermediate section has an intermediate diameter; and a lowest section (tip) has the smallest diameter. The presence of the intermediate section enables control over the stiffness of the section located immediately above the tip as well as control over the mechanical resonance characteristic of the probe device when it scans a sample surface to be measured.

12 Claims, 3 Drawing Sheets

FIBER PROBE DEVICE HAVING MULTIPLE DIAMETERS

TECHNICAL FIELD

This invention relates to probe devices, and more particularly to metrological fiber probe devices and to methods of making them.

BACKGROUND OF THE INVENTION

More than 100 years ago, the famous physicist Ernst Abbe described a fundamental limitation of any microscope that relies on any lens or system of lenses in an imaging system to focus light or other radiation: diffraction obscures (makes fuzzy) those details of the image that are smaller in size than approximately one-half the wavelength of the radiation. See "Scanned-Probe Microscopes" by H. Kumar Wickramasinghe, published in *Scientific American*, Vol. 261, No. 4, pp. 98–105 (October 1989). In other words, the resolution of the microscope is limited by the wavelength of the radiation. In order to circumvent this limitation, researchers have investigated the use of, inter alia, various types of imaging probes. Scanning tunneling microscopy (hereinafter "STM") devices, atomic force microscopy (hereinafter "AFM") devices, and near-field scanning optical microscopy (hereinafter "NSOM") are some examples of different types of probe microscopes.

In STM, a metallic probe is brought sufficiently close to a conducting sample surface such that a small tunneling current is established. The magnitude of this current is extremely dependent on the tip-to-sample distance (i.e., topography of the sample surface). The tip is allowed to scan laterally across the (irregular) surface of the sample body with several angstroms separation between tip and sample in order to achieve imaging with atomic-scale resolution. The tunneling current, and hence the tip-to-sample separation, is detected and controlled by an electromechanical feedback servomechanism. In AFM, imaging is achieved in a similar manner to that of the STM except that the atomic forces (either short-range repulsive or long-range attractive) are detected instead of tunneling current. An obvious advantage to this technique is that the tip and sample do not have to be conductive, all materials exert atomic forces.

An NSOM device is typically comprised of an aperture located at the tip of an elongated optical probe, the aperture having a (largest) dimension that is smaller than approximately the wavelength of the optical radiation that is being used. During device operation, the probe is positioned in close proximity to the surface of a sample body. The aperture of the probe is then allowed to scan across the surface of the sample body at distances of separation therefrom all of which distances are characterized by mutually equal forces components exerted on the probe device in the direction perpendicular to the global (overall) surface of the sample body, the scanning being detected and controlled by an electromechanical feedback servomechanism as was the case in STM and AFM.

For example, U.S. Pat. No. 4,604,520, describes, inter alia, a probe device having an aperture located at the tip of a cladded glass fiber that has been coated with a metallic layer. The aperture is drilled into the metallic layer at the tip of the fiber at a location that is coaxed with the fiber. The (immediate) neighborhood of the tip is composed of a section of solid glass fiber that has obliquely sloping (truncated conical) sidewalls, whereby the sidewalls do not form a cylinder of any kind. Therefore, as the probe device laterally scans a rough surface, the calculations required to determine the desired information on the actual contours (actual profile) of the surface of the sample body require prior detailed knowledge of the slanting contours of the sidewalls of the probe, and these calculations typically do not yield accurate metrological determinations of the desired profile of the contours of the surface of the sample body, especially at locations of the surface of the sample body where sudden jumps (vertical jumps) thereof are located. In addition, fabrication of the probe device is complex and expensive, especially because of the need for drilling the aperture coaxially with the fiber.

Another example involves the fabrication of nanometric tip diameter fiber probes for photon tunneling microscopes ("PSTM") by selective chemical etching of the GeO2-doped cores of optical fibers. See "Reproducible Fabrication Technique of Nanometric Tip Diameter Fiber Probe for Photon Scanning Tunneling Microscope", Togar Pangaribuan, et. al., *Japan Journal Applied Physics*, Vol. 31 (1992), pp. L 1302-L 1304. By selectively etching the $GeO_2$ doped regions of the fiber, a tapered tip having the shape of a small cone can be formed on the endface of the optical fiber. The cone angle of the fiber probe tip is controlled by varying the doping ratio of the fiber core and the composition of the etching solution. A fiber probe with a cone angle of 20° and tip diameter of less than 10 nm was fabricated. Only probes having conical-shaped endfaces can be made with this technique, so that the sidewalls do not form a cylinder of any kind. The scanning range of such a probe is undesirably limited owing to the relatively large width (diameter) of the endface on which the relatively short-width conical tip is centered, coupled with the fact that, during scanning, the probe is rastered from side-to-side in an arc: a desired large length of scan is attempted, the corners of the probe's end face undesirably will make contact with the sample surface. In addition, the conical shape of the tip undesirably limits the accuracy of measurements wherever the surface being probed has a sudden jump.

SUMMARY OF THE INVENTION

This invention involves, in a specific device embodiment, a probe device, that can be used for surface metrology (for probing and measuring the contours of surfaces). The device can be used as an STM, AFM, or NSOM device. The device comprises a fiber having a relatively thick upper cylindrical region terminating in a first intermediate tapered region that terminates in a cylindrical intermediate region. This cylindrical intermediate region terminates in a second intermediate tapered region that terminates in a lowest right cylindrical region. The uppermost region, the cylindrical intermediate region, and the lowest cylindrical region have respective maximum widths that are monotonically decreasing.

The lowest cylindrical region can have a maximum width in the approximate range of 0.01 μm to 150 μm, and it terminates at its bottom extremity in an essentially planar end surface oriented perpendicular to the axis of the thin cylindrical portion. As used herein, the term "approximate" has its ordinary meaning in terms of significant figures. Also, as used herein, the term "maximum width" refers to the maximum diameter—i.e., the length of the longest line segment that can be drawn in a cross section of a cylindrical region of a fiber segment, the line segment being oriented perpendicular to the axis of the cylinder, from one extremity of the cross section to another. In the case of a circular cylindrical region, the width (=diameter) in any direction of each such cross section is thus equal to this maximum width. The cylindrical intermediate region can have a height d and a maximum width W such that the ratio d/W is in the approximate range of 1 to 100. The lowest cylindrical region can have a height h such that the ratio d/h is in the approximate range of 10 to 1,000.

In order to make such a probe device, a fiber segment originally having a right cylindrical shape, is subjected to two separate etching steps, typically essentially isotropic wet etching, at two differing vertical positions in an etching solution, followed by cleaving and a third essentially isotropic etching step. As used herein the term "essentially isotropic etching" refers to cases in which the etching rates in the axial and radial directions do not differ from each other by more than approximately 10 percent. In this way, the final fiber probe device has, in the case of a circular cross section, two etched diameters in addition to the original (unetched) diameter, whereby enhanced sensitivity to (attractive) tension and shear forces is achieved. More particularly, the mechanical resonance characteristic of the probe device can be adjusted in particular by adjusting the length and diameter of the intermediate region located immediately above the lowest region (which has the smallest diameter) simply by adjusting the etching steps. This intermediate region can, thus have a desired stiffness as well as can produce a desired mechanical resonance characteristic during operation of the resulting fiber as a probe device (i.e., as it is moved across a surface of a sample body to be measured).

In another embodiment, the invention involves a method of making such a probe device and using it for surface metrological purposes such as AFM, STM, or NSOM.

The fact that the lowest region of the probe device terminate in a planar end surface—advantageously oriented perpendicular to the axis of the cylinder—enables accurate positioning and hence position-determinations of the probe device at locations of a surface of the sample body being scanned by the probe, even at sudden jumps in the surface. And the fact that the lowest region of the probe device has the form of a cylinder simplifies the determination of the profile of the surface of the sample body. The probe's sidewalls advantageously are coated with a suitable layer, such as an optically reflecting layer, for confinement of the light inside the fiber probe tip especially if and when the probe is used for NSOM applications.

Only for the sake of clarity, none of the FIGURES is to any scale.

DETAILED DESCRIPTION

Figure 1:
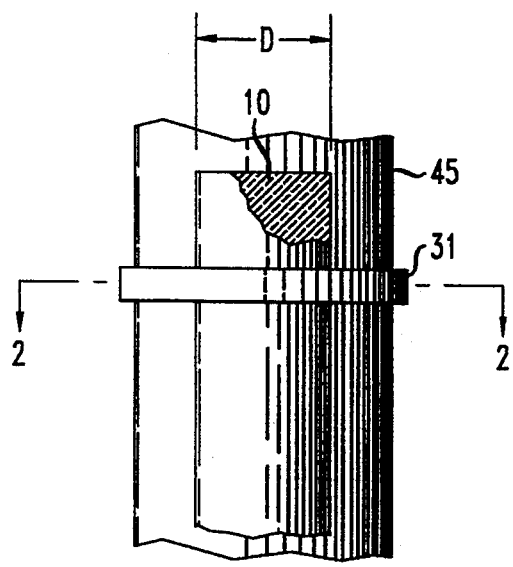
FIG. 1 is an elevational diagram, partly in cross section, of a fiber probe device in an early stage of its fabrication in accordance into a specific embodiment of the invention.

Referring to FIG. 1, a fiber segment 10, typically an optical fiber segment, typically takes the form of a solid circular cylinder having a diameter D. It is held by a holder 45, typically made of teflon, with the aid of a segment of adhesive tape 31. The material of the glass fiber segment 10 can be but need not be uniform. For example, it can have a central core surrounded by a peripheral cladding as known in the art and as discussed in greater detail below. At any rate, the material of the fiber segment 10 typically is circularly symmetric.

The fiber segment 10 is immersed (FIG. 3) in a wet essentially isotropic etching solution 50, typically a buffered oxide etching solution 50—such as a solution composed of 2 parts (7:1) buffered oxide etch, 1 part hydrofluoric acid, 1 part acetic acid, and 1 part $H_2O$. The acetic and $H_2O$ components help dissolve the accumulation of unwanted residual material on the fiber surface during etching. The etching solution 50 is contained in a container 60, and it has a level 52 that intersects the fiber segment 10, whereby an entire (lower) portion of the surface of the fiber segment 10 is submerged in the solution 50.

Figure 3:
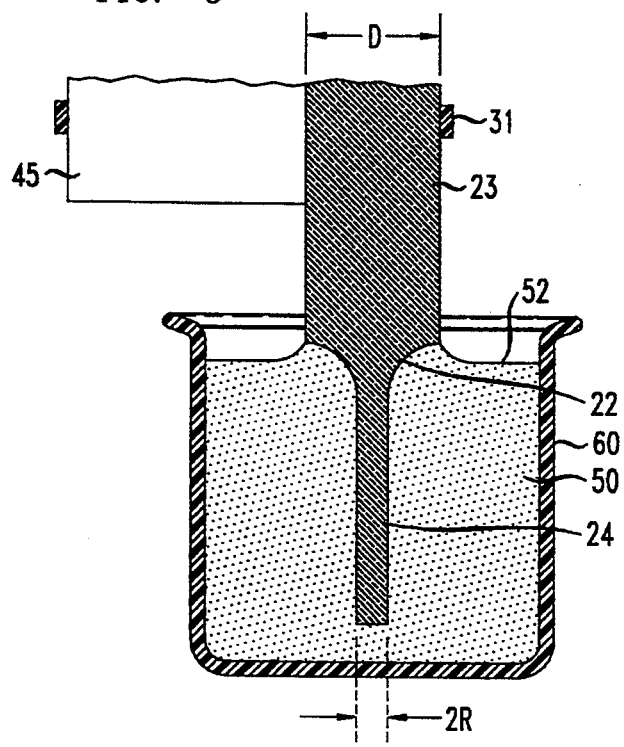
FIG. 3–6 are elevational cross-section diagrams of a fiber probe device during successive stages of its fabrication in accordance with a specific embodiment of the invention.

After the fiber segment 10 has been immersed in the etching solution 50 for a predetermined amount of time, it assumes the shape shown in FIG. 3—that is, a relatively thick upper solid cylindrical region 23—i.e., in the form of a solid circular cylinder—terminating in a tapered intermediate (transition) region 22, in the form of a tapered solid circular region, and terminating in a relatively thin lower cylindrical region 24, in the form of another solid circular cylinder.

For example, diameter of the upper region 23 of the fiber segment is typically equal to approximately 125 $\mu$m or more. After having been etched with the solution 50, the thin lower region 24 has a diameter 2R (FIG. 3) typically equal to approximately 50 $\mu$m, as determined by the time duration of the immersion.

With the aid of, for example, a vertical-positioning-micrometer apparatus (not shown) or a telescopic monitoring apparatus, the fiber segment is partially withdrawn vertically from the etching solution 50 (FIG. 4) by a predetermined distance d. Typically this distance d is in the approximate range of 5 $\mu$m to 2,000 $\mu$m, advantageously approximately 50 $\mu$m to 500 $\mu$m. In this way, the location of the etching solution-air interface is moved along the fiber segment 10 toward its lower endface. The immersion of the fiber segment in the solution 50 is then continued for another predetermined amount of time until the resulting width 2R-Δ of the lowest region 27 of the fiber becomes reduced to a predetermined desired value, typically to approximately 30 $\mu$m. At the same time an intermediate cylindrical region 25 (FIG. 4) of height d is thus formed, located above the etching solution level and having the same diameter 2R as that of the (previous) lower region 24 (FIG. 3).

Figure 5:
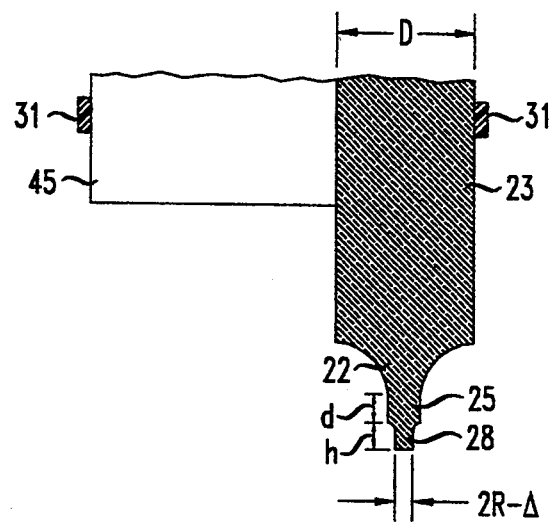

Next, the bottom face of this lowest region 27 is cleaved, advantageously, in a plane oriented perpendicular to the (common) axes of the upper region 23 and the lowest region 27, as by means of a fiber cleaver aided by optical microscopic viewing or other micrometer controlled procedure. In this way, the height of the resulting lowest cylindrical region 28 (FIG. 5) becomes equal to a predetermined reduce value h (FIG. 5), and the tip thereof is a planar surface oriented perpendicular to the axis of this lower cylindrical region 28. Typically, the height h is in the approximate range of 0.05 μm to 30 μm, and advantageously in the approximate range of 1 μm to 5 μm. Also, it is advisable that the ratio d/h be in the approximate range of 10 to 1,000, and advantageously in the approximate range of 10 to 100.

Figure 6:
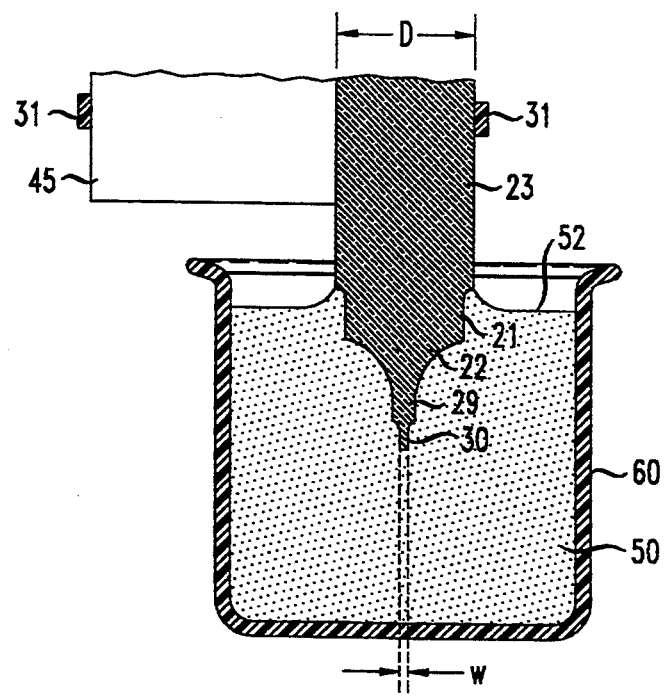

The fiber segment again is immersed (FIB. 6) in the essentially isotropic etching solution 50, for another predetermined time duration, to a solution level 52 that intersects the segment at a level located typically above the top of the tapered region 22 and that isotropically etches those portions of the fiber with which it comes in contact. In this way the resulting lowest portion 30 of the fiber segment is still a solid circular cylinder but having a further reduced diameter equal to w, while the height h thereof is reduced by at most an insignificant amount. Likewise, the height d of the intermediate region 29 is reduced by at most an insignificant amount. At the same time, the diameters of the resulting intermediate cylindrical regions 29 and 21 of the fiber are reduced. In particular, the diameter of the intermediate cylindrical region 29 is reduced to $W = \Delta + w$. Typically, the ratio (d/W) of the height d of this intermediate region 29 to its width W is in the approximate range of 1 to 100, and is advantageously in the approximate range of 1 to 10. At the location of the solution level 52, a meniscus of the etching solution 50 produces a gradual tapered transition between regions of the fiber immediately above and immediately below the solution level 52, as indicated in FIG. 6.

The resulting lowest region 30, the resulting intermediate regions 29 and 21, and the uppermost region 23 all take the form of mutually coaxial solid cylinders, typically circular cylinders. The diameter w of the lowest portion 30—i.e., the width of the tip of the resulting probe (FIG. 6)—can be adjusted to any desired value by adjusting the amount of time during which the immersion in the solution 50 is allowed to continue. This width w can be as small as approximately 0.01 μm and as large as 150 μm or more—typically in the approximate range of 0.05 μm to 0.5 μm, and advantageously in the approximate range of 0.05 μm to 0.2 μm—depending on the ultimately desired metrological use of the probe when measuring sample surfaces, i.e., depending on the desired metrological resolution of the measurements to be made by the fiber during its subsequent use as a probe device. Typically, such use involves scanning the surface of a sample body with the probe while holding the probe with an electromechanical feedback servomechanism, as known in the art, all of which distances are characterized by mutually equal components of force (for the case of AFM) in the direction perpendicular to the overall surface of the sample body.

The predetermined time durations of the immersions for the etchings (FIGS. 3-4 and 6) can be determined by trial and error, or by telescopic monitoring, in order to obtain a desired predetermined height and diameter, and hence a desired predetermined stiffness, of the intermediate region 29, as well as thus to obtain a desired predetermined mechanical resonance characteristic.

During operation of the resulting fiber segment as a probe device—i.e., as it is moved across a sample surface to be measured—a change in resonant frequency or amplitude of a vibrating fiber probe, or of both, can be is used to detect attractive or shear surface forces. The stiffness of the intermediate portion 29 can be adjusted in order to enhance the sensitivity of the fiber probe to attractive and shear forces from the sample surface. The stiffness and mechanical resonance characteristics of the fiber probe thus can be tailored by adjusting the height and width of this intermediate fiber portion 29.

For use as an NSOM device, the sidewalls of the portions 22, 29, and 30 advantageously are coated with an optically reflecting layer such as a metallic layer like chromium, or the fiber segment 10 has a core region and a cladding region as known in the art (whereby the cladding region reflects optical radiation during the NSOM use), or both.

In case the fiber segment 10 (FIG. 1) has a cladding as well as a core, advantageously—for use in an AFM device, an STM device, or an NSOM device where the cladding is desirable—the diameter of the core (in which the chemical composition is uniform) is larger than w (FIG. 6) by an amount in the approximate range of 2.5-to-3.5 μm.

Although the invention has been disclosed in detail in terms of a specific embodiment, various modifications can be made without departing from the scope of the invention. For example, instead of optical fiber, the fiber segment 10 can be made of any material that can be etched as described above, and that can be cleaved to form a (planar) tip endface. The wet etchings can be enhanced by ultrasonic agitation. The two etching solutions (FIGS. 3, 4, and 6) can be chemically different or can be physically different (i.e., can be essentially isotropic dry etchings in any of the etchings, at some sacrifice of processing speed). The etchings indicated in FIGS. 3, 4, and 6 advantageously are all, but need not be, essentially isotropic.

The solution level 52 (FIG. 6) optionally can be adjusted to be the same as, or to be slightly below, the top of the tapered intermediate region 22. In such a case, there will be no intermediate cylindrical region 21.

Figure 2:
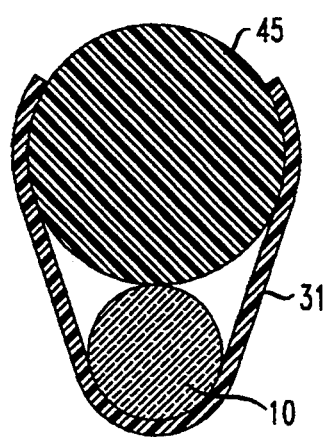
FIG. 2 is a horizontal cross-sectional diagram of the device depicted in FIG. 1.
Figure 4:
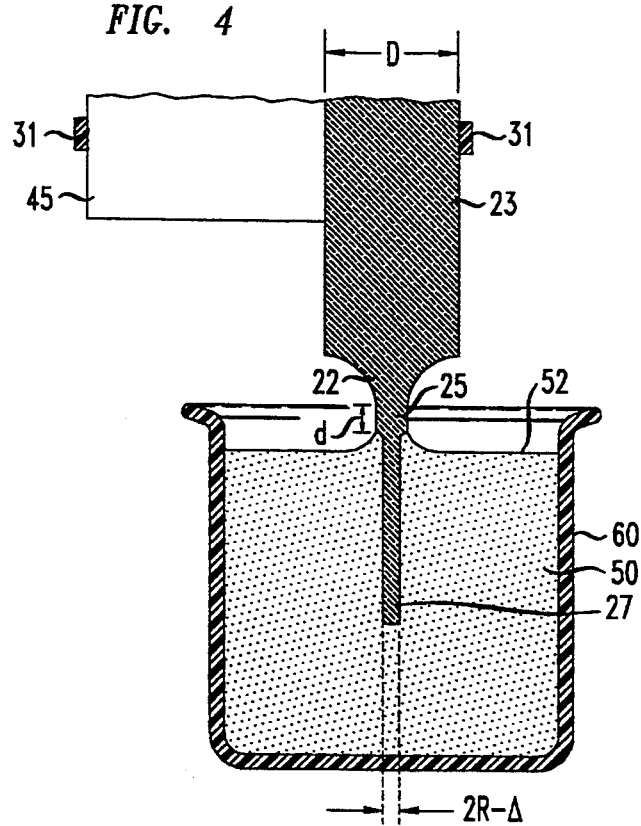

Instead of attaching the fiber segment 10 to the holder 45 and assembling them as indicated in FIGS. 1 and 2, a protective polymer resist layer can coat the sidewalls of the upper portion of the fiber segment 10, while the top endface of the fiber segment is bonded to the holder 45 by means of an adhesive medium. In this way a sharper meniscus is formed when the fiber segment is immersed for the first time (FIG. 3) in the etching solution 50, the protective resist layer being resistant to the etching. This polymer resist layer, however, is advantageously removed (at least in regions that otherwise would come in contact with the etching solution) prior to the second wet etching (FIG. 4).

Finally, the fiber segment 10 need not have a circular cylindrical shape but can have, for example, an elliptical, a rectangular, or a square shape, so that each of its cross'sections have a maximum width that differ from each other. Such non-circular cross sections can be obtained simply by cutting a glass body into such shapes.

I claim:

1. A probe device comprising:
 a fiber segment having a relatively thick upper region terminating at its lower extremity in a first tapered region that terminates in a cylindrical intermediate region, the cylindrical intermediate region terminating at its lower extremity in a second tapered region that terminates in a lowest cylindrical region;
 the upper region, the cylindrical intermediate region, and the lowest cylindrical region having respective maximum widths that are monotonically decreasing;

the lowest cylindrical region having a maximum width in the approximate range of 0.01 μm to 150 μm and terminating at its lower extremity in an essentially planar end surface oriented perpendicular to the axis of the lowest cylindrical region; and the intermediate cylindrical region having a height and a maximum width in a ratio in the approximate rate of 1 to 100.

2. The probe device of claim 1 in which the lowest cylindrical region has a height in the approximate range of 0.05 μm to 30.0 μm.

3. The probe device of claim 2 in which all the cylindrical regions are essentially silica glass and in which the height of the intermediate region is in the approximate range of 5 μm to 2,000 μm and in which the ratio of the height of the intermediate region to the maximum width of the intermediate region is in the approximate range of 1 to 100.

4. The probe device of claim 2 in which all the cylindrical regions are essentially silica glass and in which the height of the intermediate region is in the approximate range of 50 μm to 500 μm and in which the ratio of the height to the maximum width of the intermediate region is in the approximate range of 1 to 10.

5. The probe device of claim 1 in which the lowest cylindrical region has a height in the approximate range of 1 μm to 5 μm.

6. The probe device of claim 1 in which the maximum width of the lowest cylindrical region is in the approximate range of 0.05 μm to 0.2 μm.

7. The probe device of claim 6 in which the fiber is essentially silica glass.

8. The probe device of claim 1 in which the maximum width of the lowest cylindrical region is in the approximate range of 0.05 μm to 0.5 μm.

9. The probe device of claim 1 in which the upper region coaxial with the lowest cylindrical region.

10. A metrological method including the step of moving the probe device recited in claim 1 across a surface of a sample body.

11. The device of claim 1 further including an optically reflecting layer located on the sidewalls of the lowest cylindrical region.

12. A metrological method including the step of moving the probe device recited in claim 11 across a surface of a sample body.

* * * * *